Sept. 20, 1960     F. PORTER     2,952,873
APPARATUS FOR EXTRUSION OF PLASTIC PIPE
Filed April 21, 1958     2 Sheets-Sheet 1

INVENTOR.
FRANK PORTER
BY
Robert A. Harman
ATTORNEY

Sept. 20, 1960 F. PORTER 2,952,873
APPARATUS FOR EXTRUSION OF PLASTIC PIPE
Filed April 21, 1958 2 Sheets-Sheet 2

FIG.2.

INVENTOR.
FRANK PORTER
BY
Robert A. Harman
ATTORNEY

United States Patent Office 2,952,873
Patented Sept. 20, 1960

2,952,873

APPARATUS FOR EXTRUSION OF PLASTIC PIPE

Frank Porter, Morristown, N.J., assignor to Allied Chemical Corporation, a corporation of New York Filed Apr. 21, 1958, Ser. No. 729,723

1 Claim. (Cl. 18—14)

This invention relates to apparatus for extruding simultaneously a plurality of plastic pipes and cooling the pipes whereby their form is accurately set.

Numerous proposals have been made in the art for plastic pipe extrusion apparatus. Among advantages of the present apparatus are that it allows production of a plurality of pipes fed from a single source; that these pipes need not all be of the same size; and that the wall thickness of each pipe can be accurately and uniformly maintained.

My apparatus comprises as principal elements the following:

(A) A feed manifold for hot plastic; connected thereto (B) A plurality of extrusion dies; associated with each extrusion die (C) Means for controlling rate of flow of plastic to said die individually;

(D) A stiffly flexible neck surrounding the discharge opening from each extrusion die and protruding therebeyond;

(E) A jacketed cooling tube carried by said neck and having an internal helical passage for cooling liquid along the jacket;

(F) A cooled mandrel within and spaced from said cooling tube, said mandrel having an internal helical passage for cooling fluid;

(G) Centering screws for flexing said flexible neck to adjust the centering of said cooling tube about said cooled mandrel.

The aforesaid extrusion dies "B" comprise as their principal elements (1) a die head; (2) a heated body portion having therein a cavity closed at one end by the die head and inwardly tapering to form an outlet port at the other end; said body having near the head end a feed port transverse to the end-to-end axis of the body; (3) a distributing plate between said feed port and said inwardly tapering outlet of the body, said plate being in a plane perpendicular to the end-to-end axis of the body; and (4) a core passing through the die head and body cavity to form therewith a reservoir for reception of hot plastic and passing through the outlet port to form therewith a pipe-forming discharge opening, said core having an inlet passage therein connecting with the inlet to a helical passage within the aforesaid cooled mandrel "F"; and said core having also a return passage therein connecting with the outlet from the helical passage in said cooled mandrel.

The accompanying diagrammatic drawings illustrate the apparatus of my invention.

Fig. 2 shows details of an extrusion die, neck member and jacketed cooling tube and elements associated therewith in my apparatus.

Fig. 3 shows the construction of a distributing plate suitable for use in my apparatus.

Figure 1:
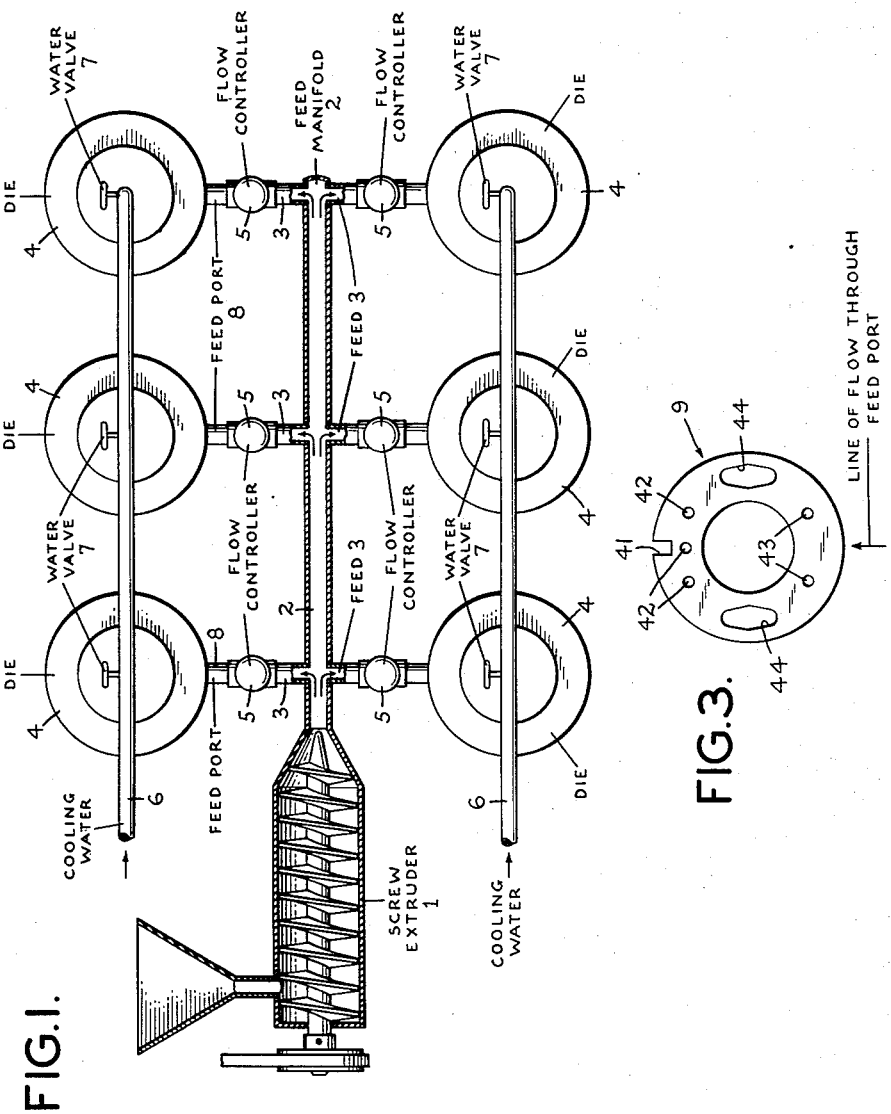
Fig. 1 shows the general organization of the apparatus, in the form of a flow diagram.

Referring to the drawings, the apparatus shown in Fig. 1 comprises a screw extruder 1, connected thereto a feed manifold 2, and feed outlets 3 leading from the feed manifold to dies 4. Flow controllers 5, which may take the simple form of valves or which may be metering pumps or the like, are provided between the feed outlets 3 and each die 4. A line 6 for cooling water to supply the cooled mandrel, described in more detail below, is connected to each die via valve 7. Each die is supplied with hot plastic through feed port 8.

Referring now to Fig. 2, feed port 8 leads via distributing plate 9 into reservoir 11. This reservoir is formed between extrusion die body 12, extrusion die head 10, and core body 13. The die body and core taper and converge to form an outlet port 14 from the die which terminates in pipe-forming discharge opening 15.

Connected to the die beyond the discharge opening therefrom is neck piece 16 which carries jacketed cooling tube 17. The jacketed cooling tube 17 together with cooled mandrel 18 form an annular passage wherein the pipe is cooled.

In cooled mandrel 18 is inserted cooling finger 19. The water supply for this cooling finger enters through pipe 22 which is carried by bore 21 within the core body 13. A second pipe 23, surrounding pipe 22 and spaced over most of its length from core body 13 leads from cooling finger to water outlet 20. Water is carried in the cooling finger by helical passage 24.

Helical passage 25 carries water for cooling tube 17. Inlet 26, connected to a supply of water not shown, provides water for helical passage 25. The jacket for the cooling tube is shown at 27 and a water outlet is shown at 28.

Supplementary equipment for the die, shown in Fig. 2, includes a soft wiper 29 which forms an outlet for the cooled pipe; an outlet for steam shown at 30; a flaring collar or flared end 31 for cooled mandrel 18, producing a diameter reduction between core body 13 and this cooled mandrel of the order of 2 or 3 mils per inch diameter; centering screws, one of which is shown at 32, for flexing neck 16; clamps, one of which is shown at 33, for attaching the jacketed cooling tube to the flexible neck; mandrel plug as shown at 34; band heater for the die as shown at 35; disc heater for the die as shown at 36; and heat retainer attached to core body 13 by screws or the like as shown at 37; and positioning pin for distributing plate 9 as shown at 38.

Fig. 3 shows details of distributing plate 9 as described in more detail below.

My invention can be more fully understood from the description which follows of operation of my apparatus wherein reference is made to the drawings. The same parts in the figures are denoted by the same numeral.

Referring to Fig. 1, a plastic material, especially a thermoplastic such as polyethylene or the like is supplied from screw extruder 1 to feed manifold 2. The outlets 3 from the feed manifold lead to the various dies 4.

Associated with each die, suitably in the line leading thereto from the feed manifold, is a flow controller 5 for controlling the plastic feed to that die individually. This flow controller can take the simple form of an adjustable valve or can take the form of a metering pump such as a gear pump or the like.

Cooling water for the cooled mandrels is supplied through lines 6. The flow thereof to each mandrel is controlled by valves 7.

Referring now particularly to Fig. 2, the hot plastic enters feed port 8 and is forced through distributing plate 9 into reservoir 11, formed between the extrusion die body 12 and the core body 13.

The distributing plate is designed to produce an even flow of plastic throughout reservoir 11 in each die. The exact design of the distributing plates in the various dies may differ but can ordinarily be the same. Generally the openings in the distributing plate are symmetrically located with reference to the plane passing through the center of said distributing plate and through the center line of the feed port; and generally the total open area is greater in the semicircular segment of the distributing plate farthest from the feed port, than in that nearest to the feed port. Generally the largest openings will lie to each side of the above defined central plane, on the line perpendicular thereto through the center of the distributing plate.

A suitable design for the distributing plate in accordance with the foregoing is illustrated in Fig. 3, wherein 41 is a notch for receiving a positioning pin, 42 are small openings in the semicircular segment farthest from the feed port, 43 are small openings in the segment nearest to the feed port, and 44 are large openings in the quadrants on each side of the central plane above defined.

From the reservoir 11 the hot plastic flows into the outlet port 14 and through the pipe-forming discharge opening 15 of the extrusion die. The plastic in the form of a pipe then enters the neck portion 16. Then the emerging pipe travels between jacketed cooling tube 17, which cools the pipe from the outside, and cooled mandrel wall 18 which cools the pipe from the inside. As shown in Fig. 2, this mandrel wall is cooled by liquid in an internal helical passage 24, suitably formed as shown between the mandrel wall and an inserted cooling finger 19.

The core body 13 contains a central bore 21 carrying inner and outer concentric pipes 22 and 23. The inner pipe serves as inlet passage for cooling water delivered to the helical passage 24 in the cooled mandrel; and the outer pipe serves as return passage for outlet water from this helical passage 24. The outer pipe is preferably, as shown in Fig. 2, smaller than bore 21, so as to leave an air gap which functions to limit heat exchange between the hot plastic in reservoir 11 and the water flowing to and from the cooled mandrel.

The jacketed cooling tube 17, like the cooled mandrel 18, is provided with a helical passage 25 for cooling water. The helical flow of cooling water in the cooling tube and mandrel promotes uniform cooling around each circumferential segment of the emerging pipe and prevents formation of gas pockets in the cooling liquid, which would produce uneven cooling of the pipe surface.

Suitably, as in the drawing, the water enters this helical passage at the end thereof adjoining the neck 16, by inlet 26; and drains into jacket 27 and out through drain cock 28. Any steam can escape around the emerging pipe, or through a special vent. The cooling jacket ends in a soft wiper 29 fitting around the pipe, whereby a chamber is formed which can be kept full of steam or inert gas if desired.

To facilitate passage of the pipe through the cooling section without sticking, the cooled mandrel can be slightly smaller than the die core at the extrusion discharge opening 15, and can be provided with a flared collar, shown at 31 in Fig. 2, to make the fit between the discharge opening and the cooled mandrel. Other means known in the art to minimize sticking can be used, e.g. a lubricant can be applied at the input end of the cooled mandrel and/or a non-solvent plasticizer or lubricant or mold release agent can be mixed with the plastic feed. Alternatively, or in addition, the wall 18 of the cooled mandrel can have self-lubricating properties as in self-lubricating bearings.

To obtain pipe with highly polished surfaces, chrome plated extrusion dies, cooling tubes, and cooled mandrels can be used. Suitable operating conditions of temperature and pressure in each extrusion die, and temperatures and flows of cooling water in each cooling tube and mandrel can be obtained in my apparatus so as to give desired surface gloss to each pipe, since each of these factors can be independently set for each individual position. Generally a relatively rapid cooling action is applied to the outer pipe surface contacting the cooling tube, whereby the newly formed pipe hardens on the outer surface first, and eventually shrinks away from the cooling tube rather than sticking therein. The cooling of the mandrel is adjusted to the rate of travel of the pipe in the particular die, to prevent "freezing" of the hot plastic on the mandrel while assuring a set pipe at the discharge end of the cooling section.

My apparatus permits very simple adjustment to maintain uniform thickness of the pipe. This is accomplished by use of the stiffly flexible neck 16 to carry the cooling tube 17. The centering screws 32 flex the neck to adjust the free end of cooling tube 17 about the cooled mandrel 18. When it is desired to adjust wall thickness, the pipe is marked at a point emerging from wiper 29. After a further length of pipe equal to the length of the cooling tube has been extruded, the position of the mark is observed as an indication of whether the pipe is rotating. Adjustment of the centering screws is then made with allowance for any rotation of the pipe. The wall thickness can be adjusted in this manner so that it does not vary appreciably about the circumference of the pipe, i.e. the inside and outside pipe surfaces are true concentric cylinders. It is found that once the wall thickness has been adjusted for a given set of operating conditions no further adjustment is likely to be needed.

While the foregoing description of my apparatus and operation thereof is illustrative of my invention and of the best mode contemplated by me for using the same, it is not intended to limit the invention to all details thereof; but the invention is to be understood as including the subject matter of the following claim, and the equivalent thereof.

I claim:

In an apparatus for extrusion of plastic pipe: a stiffly flexible neck surrounding the discharge opening from an extrusion die; a tube carried by said neck; a mandrel within and spaced from said tube; and centering screws exerting torque on said tube by applying longitudinal forces adjacent said neck for flexing said flexible neck to adjust the centering of said tube about said mandrel.

References Cited in the file of this patent

UNITED STATES PATENTS

| | | |
|---|---|---|
| 1,925,545 | Royle | Sept. 5, 1933 |
| 2,177,660 | Kimble | Oct. 31, 1939 |
| 2,210,004 | Rautenstrauch | Aug. 6, 1940 |
| 2,519,375 | Jargstorff et al. | Aug. 22, 1950 |
| 2,740,989 | Henning | Apr. 10, 1956 |
| 2,821,745 | Patton | Feb. 4, 1958 |

FOREIGN PATENTS

| | | |
|---|---|---|
| 237,824 | Great Britain | Aug. 6, 1925 |
| 624,699 | Great Britain | of 1949 |
| 687,739 | Great Britain | Feb. 18, 1953 |